Oct. 28, 1969   L. J. B. LA COSTE ET AL   3,474,672
STABILIZED PLATFORM FOR GRAVIMETER

Filed Jan. 25, 1967   3 Sheets-Sheet 1

Lucien J. B. LaCoste
Henry N. Clarkson
George V. Hamilton
INVENTORS

BY
ATTORNEYS

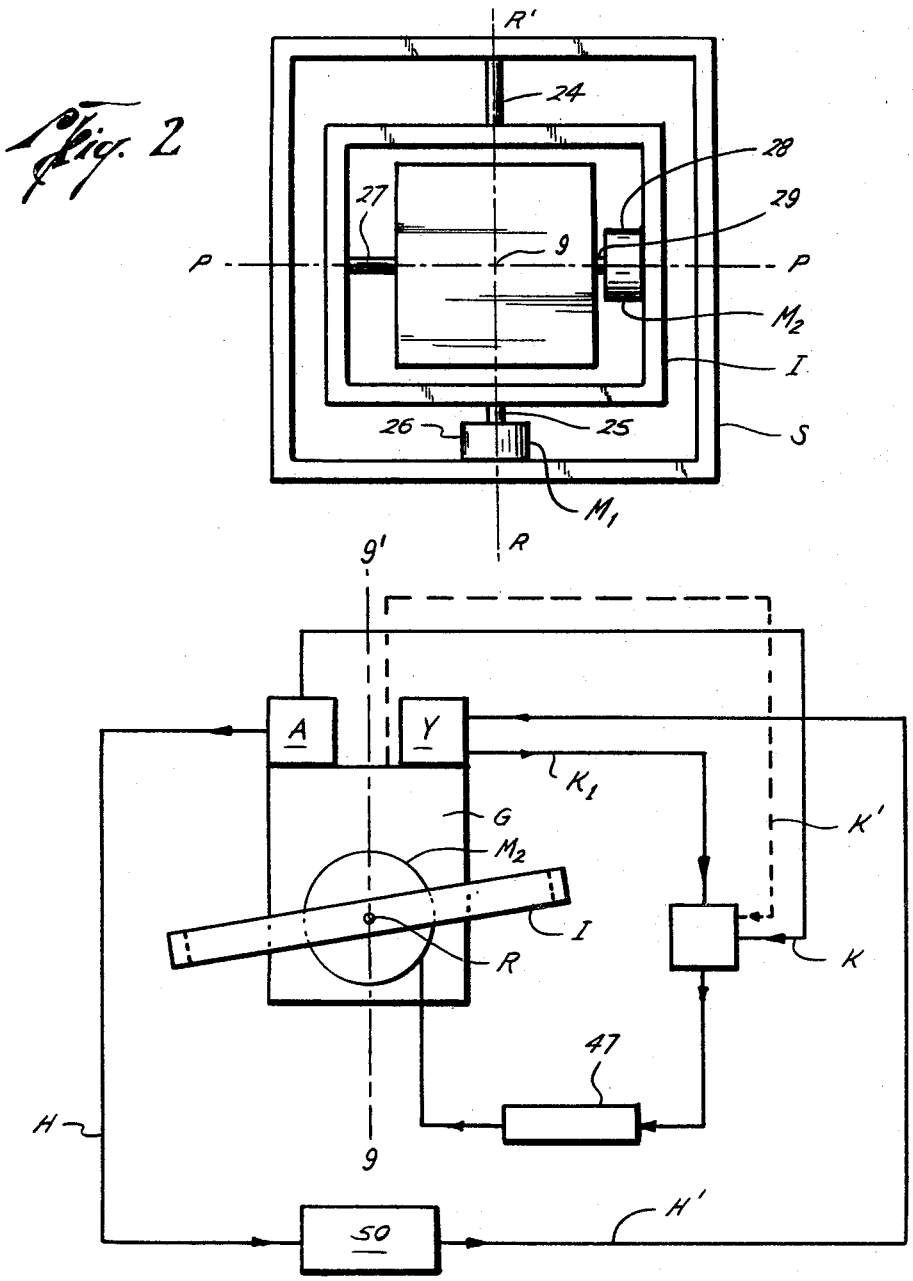

Oct. 28, 1969  L. J. B. LA COSTE ET AL  3,474,672
STABILIZED PLATFORM FOR GRAVIMETER
Filed Jan. 25, 1967  3 Sheets-Sheet 3
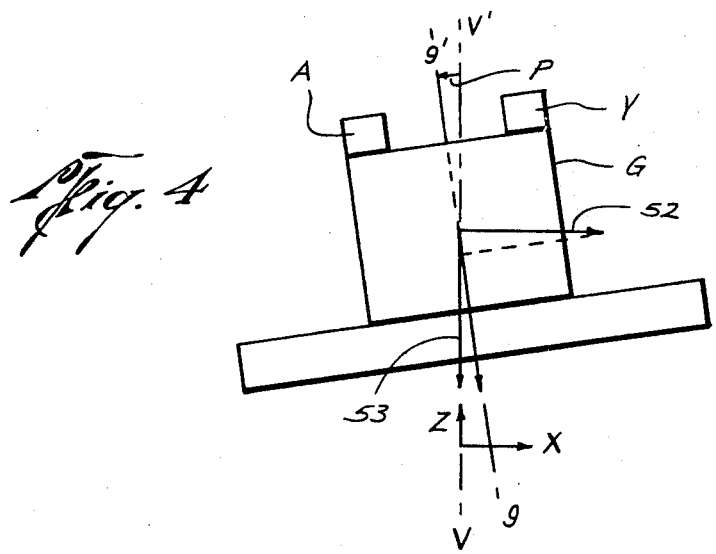
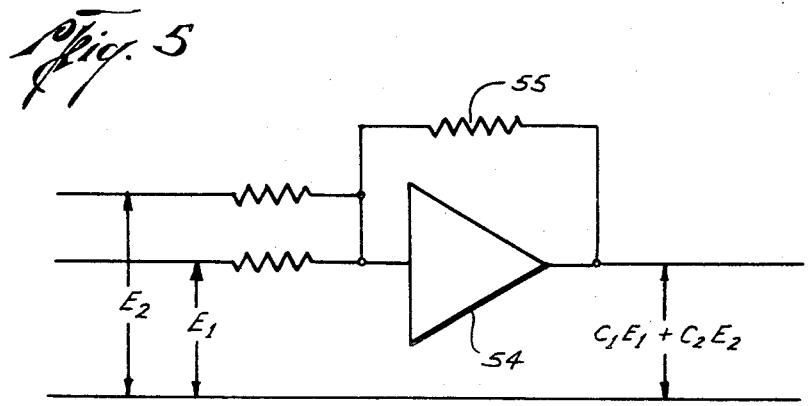
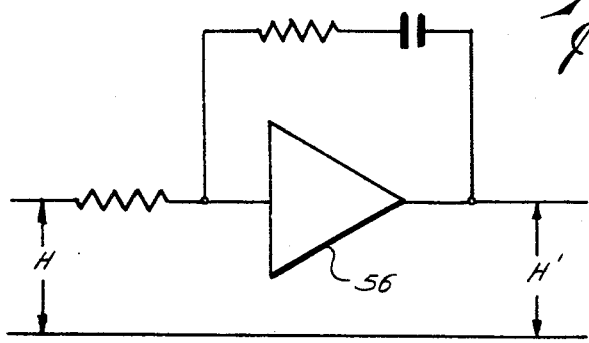
Lucien J. B. La Coste
Henry N. Clarkson
George V. Hamilton
INVENTORS United States Patent Office 3,474,672
Patented Oct. 28, 1969

3,474,672
STABILIZED PLATFORM FOR GRAVIMETER
Lucien J. B. LaCoste, Henry N. Clarkson, and George V. Hamilton, Austin, Tex., assignors to LaCoste and Romberg, Inc., Austin, Tex., a corporation of Texas
Filed Jan. 25, 1967, Ser. No. 611,729
Int. Cl. G01m 1/12
U.S. Cl. 73—382                                                              16 Claims

ABSTRACT OF THE DISCLOSURE

An improved stabilized platform for a gravimeter which maintains its vertical axis substantially vertical with improved servo loops controlling gimbal mounting which make the dynamic gravimeter error due to motion compensate for static error due to non-verticality, and improved insulated shockmounting.

FIELD OF THE INVENTION

The present invention relates to an improved stabilized platform which is particularly suitable for mounting a gravity meter such as is disclosed in the prior L. J. B. La Coste Patent No. 2,977,799 which issued Apr. 4, 1961.

For more than a decade gravity meters have been used to measure gravity in moving vehicles. One type of gravity meter is described in the aforementioned Patent No. 2,977,799. This patent discloses that the gravity meter could be mounted either on a stabilized platform to keep it vertical or in gimbals with corrections being made for the swinging of the gravity meter as described in the prior La Coste Patent No. 2,899,826 which issued Aug. 18, 1959. Until recently the latter method was generally preferred. However, the corrections required to compensate for the swinging encountered with gimbals in rough weather are of substantial magnitude as to render the stabilized platform worthy of investigation.

Operation on a stabilized platform subjects the gravity meter to greater acceleration forces normal to its sensitive axis than are present when the gravity meter is suspended in gimbals. The explanation for this is given in the previously mentioned Patent No. 2,899,826 and in applicants' article entitled "La Coste and Romberg Stabilized Platform Shipboard Gravity Meter" which appears in the February 1967 issue of Geophysics. As explained in this article, the greater normal forces make it desirable to stiffen the suspension of the movable element in the gravity meter so as to more nearly restrict the motion of the movable element to one degree of freedom. The article describes how this was done.

Aslo it should be noted that either the gimbal suspended version or the stabilized platform type requires a stabilized reference. Until recently the applicants' preferred type of stabilized reference was the long period pendulum described in the La Coste Patent No. 2,964,948 which issued Dec. 20, 1960. The reason for this preference was the long life of the pendulum compared to that of earlier gyros. However the lives of good gyros have now been increased sufficiently that this is no longer a problem. Therefore it is now feasible to make use of the high accuracy and stability which is available in gyros to control the stabilized platform.

SUMMARY

The use of the applicants' modified gravity meter on the gyro-stabilized platform described in this application not only makes it possible to make gravity measurements in the presence of much greater accelerations (rougher weather at sea) but also improves the accuracy of such measurements by almost an order of magnitude.

One object of the invention is to provide an improved stabilized platform for a gravity meter having adequate vertical accuracy and stability for the precise measurement of gravity on a moving vehicle.

A second object of the invention is to provide an improved shockmount for the stabilized platform to isolate the platform from vehicle vibrations without reducing the speed of response of the stabilized platform.

A third object is to provide an improved erection system on a stabilized platform for a gravity meter which minimizes gravity meter errors due to horizontal accelerations for a given erection time constant or period.

Another object is to provide inputs to the improved platform erection system which compensate for gravity meter errors caused either by platform verticality errors or by certain design or construction imperfections in the gravity meter.

BRIEF DESCRIPTION OF THE DRAWINGS

These and other objects and advantages of the present invention are hereinafter set forth with reference to the description of the preferred embodiment illustrated in the drawings wherein:

FIGURE 2 is a plan view of the gimbal mounting shown in FIGURE 1 without any other structural details.

FIGURE 3 is a schematic block diagram of the improved stabilized platform erection system.

FIGURE 4 is a simplified diagram of a gravity meter on a stabilized platform.

FIGURE 5 is a circuit diagram of an adding circuit used in the servo loop.

FIGURE 6 is a circuit diagram of the circuit used to precess the gyro.

DESCCRIPTION OF THE PREFERRED EMBODIMENT

Figure 1:
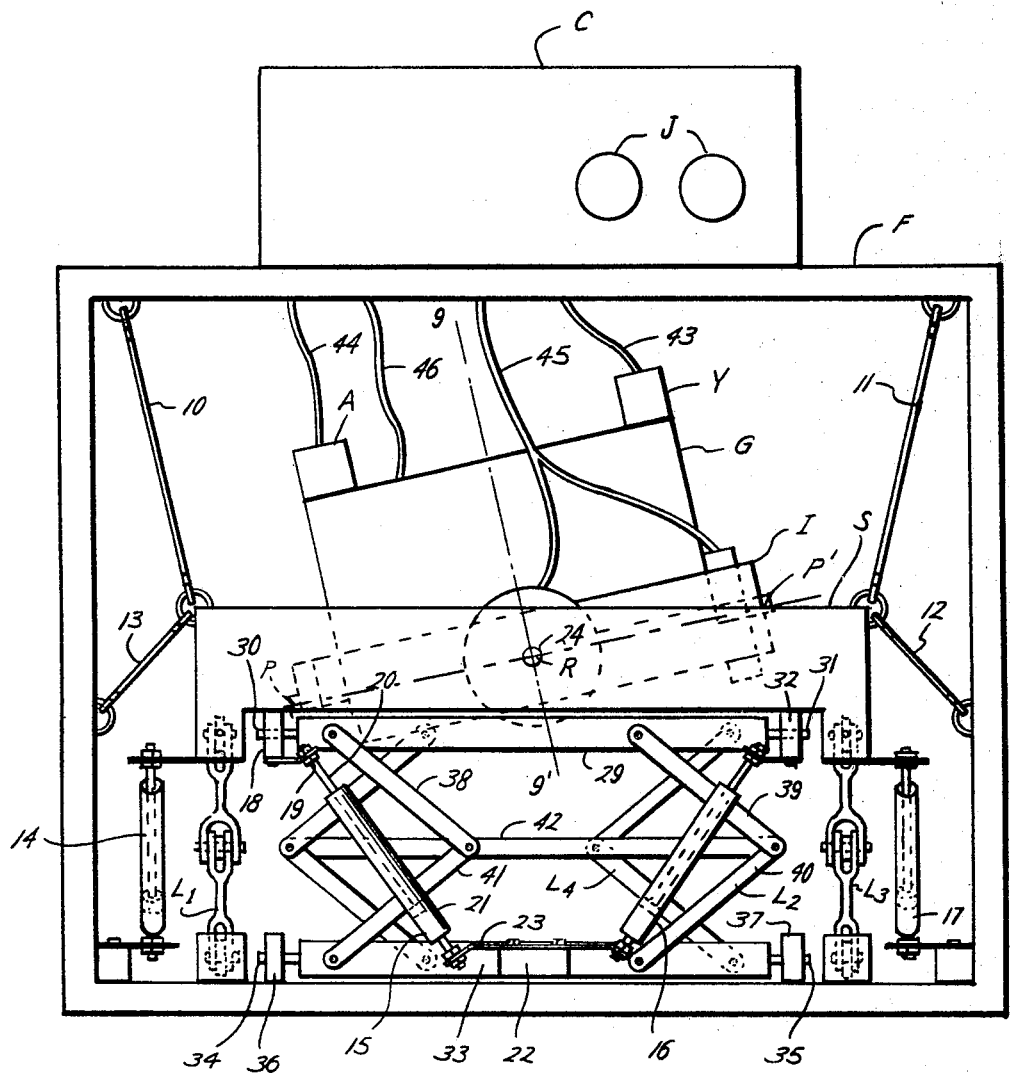
FIGURE 1 is an elevation view showing a gravity meter supported in the improved shockmounted stabilized platform of the present invention.

In FIGURE 1 the preferred form of stabilized platform is shown suspended from the frame F by resilient shockmounting means such as the elastic shockcords 10, 11, 12 and 13 and others (not shown) at each corner of frame F which extend from the frame F to the stabilized platform support S. The use of shockcords isolates the support S, and therefore the gravity meter G, from the vibrations of the ship or other vehicle on which the unit is mounted. Vibration isolation of the gravity meter is important because vibrations might cause resonances in the internal parts of the gravity meter, which would introduce errors into its readings. The resonant frequencies of the gravity meter used in the present invention are in the range of 50 to 200 cycles per second. Vibrations in this range can be sufficiently attenuated by adjusting the length and stiffness of the shockcords to give the shockmounted suspension a natural period of about two cycles per second. Obviously it would be possible to replace the shockcords by such things as springs or commercial types of shockmounts.

In order to avoid excessive oscillation of the shockmounted support at its natural period of about two cycles per second, damping means or shock absorbers 14, 15, 16 and 17 and others (not shown) are attached between the support S and the base of frame F. These dampers are preferred to be the piston-cylinder type and are symmetrically spaced around the support. Referring to damper 15, its upper end is attached to the lug 18 on the support S through the leaf spring 19 whise ends are clamped to the lug 18 and to the plunger 20 of the damper 15. The cylinder 21 of the damper is similarly attached to the lug 22 on the frame through the leaf spring 23. The cylinder 21 is partially filled with a damping-fluid such as oil to provide adequate damping. The leaf springs 19 and 23 are needed to prevent the transfer of high frequency vibrations from the frame F to the support S because the type of damper described transmits such vibrations without much attenuation. The construction and mounting of the other dampers are similar to that of damper 15.

The gimbal ring I is pivotally attached to the support S on the axis R–R', which is perpendicular to the plane of FIGURE 1. The pivot is provided by the servomotor M and the shaft 24 on the oposit side of the ring I. Shaft 24 is mounted in bearings (not shown) in the ring I and servomotor shaft 25 is secured in the ring I. Shaft 24 and servomotor stator 26 are fixed to support S. Relative angular motion between the ring I and the support S is controlled by the servomotor $M_1$.

Similarly the case of the gravity meter G or platform structure in other applications is pivotally attached to the ring I along the axis P–P', which is substantially normal to the previously mentioned axis R–R'. The pivot is provided by the shaft 27 and servomoter $M_2$. Shaft 27 and stator 28 of servomoter $M_2$ are normally fixed to ring I, and shaft 27 and servomoter shaft 29 are mounted to the case of the gravity meter G; shaft 27 being mounted in bearings (not shown).

Relative angular motion between the gravity meter G and the ring I is controlled by the servomoter $M_2$. Thus, the two servomotors $M_1$ and $M_2$ provide the means for moving the platform with respect to the frame F. The servomotors $M_1$ and $M_2$ are preferably torque motors such as those manufactured by the Inland Motor Company. The control box C provides suitable power means for driving the servomotors $M_1$ and $M_2$.

The two servomotors $M_1$ and $M_2$ are operated to keep the sensitive axis 9–9' of the gravity meter G vertical for all pitch and roll positions of the ship or other vehicle and frame F. It should also be noted that no provision has been made for rotation about an azimuth (or approximately vertical) axis. There is no reason why this third axis of rotation cannot be provided so as to keep the gravity meter in a constant orientation with respect to north, but this has not been found to be necessary in the attainment of adequate accuracy in gravity measurement when the ship travels in a reasonably straight line. The third axis of stabilization would of course be needed if it were desired to measure gravity while the ship is doing much turning.

The desirability of shockmounting the support S has already been discussed. However, it has not yet been mentioned that such shockmounting also presents a problem in not providing a stable support against which the servomotors $M_1$ and $M_2$ can react. The absence of a stable support causes increased lags in motor control which results not only in slower response but also in an increased tendency for the servomotors to hunt. If hunting occurs, it can cause resonance in the gravity meter, which will result in errors. One method of providing a more stable support S is to make it very heavy, but since added weight is objectionable, the following stabilizing means is provided.

Parallel motion means including the four parallel linkages $L_1$, $L_2$, $L_3$ and $L_4$ have been attached between the support S and the base of frame F to provide the stabilizing means for supporting the reaction of the servomotors. Bar 29 has two in-line shafts 30 and 31 at its ends. These shafts operate in bearings (not shown) on the lugs 18 and 32 which are fixed to and depend from the support S. A similar bar 33 has two in-line shafts 34 and 35 at its ends which operate in bearings on the lugs 36 and 37 fixed to the frame. The equal length bars 38, 39, 40 and 41 are pivotally mounted to the bars 29 and 33 as shown. The other ends of bars 38 and 39, 40 and 41 are pivotally mounted to the bar 42. The distances between the pivot points of each of bars 38, 39, 40 and 41 are made equal. The distances between pivots on bars 29, 33 and 42 are also equal. The resulting linkage is then one of the well-known linkages which can provide parallel motion between the support S and the base of frame F.

The use of four such parallel linkages as shown, provides a means to insure that there can be translation in any direction between the support S and the frame F but no relative angular motion, i.e., the support S is maintained in parallel relation to the base of frame F. Therefore with regard to angular motion, the support S is as stable as the frame F, and the servomotors react with a high speed of response to control the verticality of the gravity meter without having any hunting tendency. On the other hand, the shockmounting still adequately attenuates any translation vibrations of the frame F.

It is also possible to similarly attenuate angular oscillations by making suitable adjustments. Oscillations of the frame F about an axis parallel to the axis R–R' cause oscillations of the support S about its center of gravity. Therefore by adjusting its center of gravity to be on the axis R–R', such oscillations are not transmitted to the ring I because of the pivotal connection between the support S and the ring I on the axis R–R'. If the center of gravity were not adjusted correctly, oscillation of the support S would be transmitted to the ring I as a translation.

Next consider oscillations of the frame F about an axis parallel to the axis P–P', which are transmitted to the support S and to the ring I, and result in an oscillation about the combined center of gravity of the ring I and the support S. By adjusting this center of gravity to be on the axis P–P', such oscillations are not transmitted to the gravity meter G.

As previously mentioned, the servomotors $M_1$ and $M_2$ operate to keep the sensitive axis 9–9' of the gravity meter G stabilized in a vertical direction. The servomotors are controlled by signals from the gyros Y and the accelerometers A. The signals are transmitted through cables 43 and 44 respectively to servo control circuits in the control box C. The output of the circuits is transmitted through cable 45 to the motors $M_1$ and $M_2$ to complete the servo loops. Signals from the gravity meter G are also transmitted to the control box through the cable 46 in order to obtain the gravity reading. In actual practice the cables travel from the gravity meter G to the ring I near the axis P–P' and then to the support S near the axis R and finally to the control box C rather than directly to it as indicated in FIGURE 1.

As is clearly disclosed in said aforementioned patents, the gravity meter is provided with a means to sense the location of the gravity meter beam and to provide an output in response to such position. The control box C includes indicating means J of the beam position. The output providing this indication is used as hereinafter set forth to tilt the gravity meter in phase with the motion of the beam or gravity responsive element to compensate for a cross-coupling error.

The operation of the stabilization loops for each stabilization axis is indicated in the block diagram of FIGURE 3. There are actually two servo loops for each stabilization axis. In one loop a suitable signal from the gyro Y plus a correction signal K are fed to the servoamplifier 47 and then to the servomotor $M_2$ which drives the gravity meter G on which the gyro Y is mounted, thereby completing the loop. The preferred gyro is a Honeywell GG 49 gyro. This gyro will provide an electric output signal indicative of the angular position of the gravity meter G. It is a single axis gyro and therefore one gyro is necessary for each stabilization axis. The GG 49 gyro has an accuracy and stability which is adequate for inertial navigation. The gyro Y is an integrating gyro and therefore its output $k_1P$ is proportional to its angular motion P. If desired, a single gyro which has two output signals, one for each stabilization axis, may be used.

In FIGURE 3 the gyro output $k_1P$ is fed to the adding circuit 48 to be added to correction signal K, which is also fed to the adding circuit. The effect of the correction signal is hereinafter considered but for the present is assumed to be zero. In this case, the gyro output $k_1P$ is fed to the high gain servoamplifier 47 which is preferably a model 200B Inland Torque Amplifier. The servo-amplifier 47 operates the motor $M_2$ to very nearly null the angle P, thereby preventing angular motion of the gyro in space, which is equivalent to stabilizing it in a fixed direction in space.

Since this fixed direction is not in general the direction for which the sensitive axis 9-9' of the gravity meter G is vertical, a second servo loop is required to satisfy that requirement. In this loop the output of the accelerometer A is fed to a simple analog computing circuit in the gyro precesser 50 which transmits a signal which includes such output and its time integral to precess the gyro to slowly null the accelerometer output. The integral term in this feedback from the accelerometers is used to eliminate an error that would otherwise be present because of the rotation of the earth. The earth's rotation requires an equal precession rate of the gyro in order to keep the platform vertical. This precession rate would require a constant error signal from the accelerometer if there were no integral term in the feedback.

The use of both error and integral of error in the feedback gives a second order differential equation, and therefore the stabilized platform behaves exactly like a long period damped pendulum. The amount of integral feedback determines the natural period of oscillation of the stabilized platform and the amount of ordinary feedback determines its damping.

A suitable accelerometer is the Donner Model 4310. The details of operation are as follows. The horizontal accelerometer output (FIGURE 4) is (1) $\qquad H = k_2(\ddot{x} + gP)$ where $k_2$ is a constant, $\ddot{x}$ is the acceleration in the horizontal direction $x$, $g$ is gravity, and P is the angular tilt of the accelerometer from horizontal. Throughout this patent application differentiation with respect to time will be denoted by a dot over the appropriate symbol. The gyro precesser 50 amplifies its input signal and adds to it an amplification of the integral of its input signal. Its output is therefore (2) $\qquad H' = k_3(\ddot{x} + gP) + k_4 \int (\ddot{x} + gP) dt$ where $k_3$ and $k_4$ are constants. This voltage $H'$ is used to precess the gyro and therefore the gyro precession rate $\dot{P}$ is proportional to $H'$ or (3) $\qquad \dot{P} + k_5(P + \ddot{x}/g) + k_6 \int (P + \ddot{x}/g) dt = 0$ where $k_5$ and $k_6$ are constants.

Differentiating (3) with respect to time gives (4) $\qquad \ddot{P} + k_5 \dot{P} + k_6 P = -k_5 \dddot{x}/g - k_6 \ddot{x}/g$ Equation 4 is the basic equation describing the stabilized platform performance; it is well known in the stabilized platform art. It will be used here to determine how the parameters $k_5$ and $k_6$ should be chosen to obtain optimum gravity meter performance. In this connection it should be noted that (4) is the equation for simple harmonic motion in P and therefore it can be written as (5) $\qquad \ddot{P} + 2fw_0\dot{P} + w_0^2 P = -2fw_0\dddot{x}/g - w_0^2\ddot{x}/g$ where $k_5 = 2fw_0$, $k_6 = w_0^2$, $w_0$ is $2\pi/$the natural period $T_0$ of motion, and $f$ is the relative damping.

A good but expensive choice of parameters is to make $T_0 = 84$ minutes and $f = 0$; this gives the well known Schuler stabilized platform. It is good because it gives an accurate vertical even in the presence of long period accelerations, but its long period makes it difficult and expensive to make. Also it requires stabilization in three axes rather than in only two axes. There is a much simpler and entirely adequate solution if the ship, or other vehicle, is run in a reasonable straight course. In this case, as will be shown later mathematically, the natural period $T_0$ can be chosen about ten times longer than the longest period of sea waves of appreciable amplitude. However the period $T_0$ should not be chosen longer than necessary because of greater difficulty and cost in making the stabilized platform and because transients after changes in ship's course decay more slowly with long natural periods. For these reasons, periods of 4 and 6 minutes were chosen, and a switch is provided for switching from one to the other. The advantage of switching from one period to another is to be able to check the adequacy of the period. If the gravity reading remains the same after changing periods, then either period is adequately long. In actual operation at sea, the four minute period has always been found to have been adequate.

It will now be shown that the gravity meter errors occurring for any given period of the stabilized platform are very greatly reduced by choosing the parameter $f$ near its optimum value. This optimum value for $f$ is $1/\sqrt{2}$, which means that the damping is 0.707 time critical.

In the analysis the horizontal acceleration $\ddot{x}$ will be assumed sinusoidal and with a circular frequency $w$ as given by the relation $\ddot{x} = \ddot{x}_0 e^{iwt}$ where $\ddot{x}_0$ is a constant, $i = \sqrt{-1}$, $t$ is the time and $e$ is the base of natural logarithms. If this expression for $\ddot{x}$ is substituted into (5) and steady state conditions are assumed, then the angle P will have the form $P = P_0 e^{iwt}$ where $P_0$ is a constant. Solving (5) for P then gives (6) $\qquad P = -\dfrac{w_0^2 + i2fw_0 w}{w_0^2 - w^2 + i2fw_0 w}(\ddot{x}/g)$ For perfect operation of the stabilized platform P should be identically zero, therefore the angle P represents the angle that the sensitive axis 9-9' of the gravity meter differs from vertical.

In order to determine the effects of P on the gravity reading, reference should be made to FIGURE 4. There the sensitive axis 9-9' of the gravity meter G is shown off vertical V-V' by an angle P and a horizontal acceleration $\ddot{x}$ is indicated by the vector 52. If the vector 53 denotes gravity, the gravity meter will measure the value (7) $\qquad g' = g \cos P - \ddot{x} \sin P$ The negative sign appears in the second term because the force produced on the gravity meter by the acceleration is in the opposite direction to the acceleration. The error in gravity measurement will then be (8) $\qquad E = g' - g = -\ddot{x}P - gP^2/2$ The steady state error in gravity measurement can be obtained by substituting (6) into (8). If this is done and average values are taken, the average value of the last term in (8) becomes (9) $\qquad \overline{-gP^2/2} = -\left|\dfrac{w_0^2 + i2fw_0 w}{w_0^2 - w^2 + i2fw_0 w}\right|^2 \overline{(\ddot{x}^2/2g)}$ where the horizontal bars designate average values and the vertical bars denote absolute value. Evaluation of (9) gives

(10) $\qquad \overline{-gP^2/2} = -\dfrac{w_0^4 + 4f^2 w_0^2 w^2}{w_0^4 + 2w_0^2 w^2(2f^2 - 1) + w^4} \overline{(\ddot{x}^2/2g)}$ In the first term on the right side of (8) only the component of P that is in phase with $\ddot{x}$ is of significance in obtaining the average value. This component is the real part of the coefficient of $\ddot{x}$ in (6). The average value of the first term then becomes

(11) $\qquad \overline{-\ddot{x}P} = \dfrac{w_0^4 + w_0^2 w^2(4f^2 - 1)}{w_0^4 + 2w_0^2 w^2(2f^2 - 1) + w^4} \overline{(\ddot{x}^2/g)}$ Adding (10) and (11) gives

(12) $\qquad \overline{E} = \dfrac{(w_0/w)^4 + 2(2f^2 - 1)(w_0/w)^2}{(w_0/w)^4 + 2(2f^2 - 1)(w_0/w)^2 + 1} \overline{(\ddot{x}^2/2g)}$ A study of (12) shows that the error $\overline{E}$ is small only when $w_0/w \ll 1$; therefore that is the only case that need be considered. (The system is inoperable otherwise.) Under this condition the denominator is essentially equal to 1. It can also be seen that the numerator can be greatly reduced by making $2f^2-1=0$ because $(w_o/w)^4 \ll (w_o/w)^2$ for $w_o/w \ll 1$. This condition reduces to $f=1/\sqrt{2}$ which was previously stated to be the desired condition on the damping coefficient.

An inspection of Equations 3, 4, and 5 shows that the period $T_o(=2\pi/w_o)$ can be adjusted by varying the constant $k_6$, which expresses how much the integral of the accelerometer signal is amplified before being fed to the gyro to precess it. Similarly the relative damping $f$ can be adjusted by varying the constant $k_5$, which expresses how much the accelerometer signal is amplified before being fed to the gyro to precess it.

It is interesting to determine from (12) how much the gravity error is reduced by taking $f=1\sqrt{2}$ rather than 0 or 1. An inspection of (12) shows that for $w_o/w=0.1$ the error is reduced by a factor of approximately 200. This is an enormous improvement and shows the value of properly adjusting the damping term in the stabilized platform control loop. It should be noted that (12) shows that the gravity error can also be reduced for a given $w$ by choosing a smaller $w_o$. This is equivalent to choosing a longer natural period for the control loop because $$w_o=2\pi/T_o$$

However increasing $T_o$ not only makes the stabilized platform more difficult and costly to make for the same accuracy but also increases the decay time of objectionable transients that occur after changes in the ship's course. On the other hand the improvement in accuracy obtained by properly adjusting the damping coefficient is obtained without any bad effects. The proper choice of damping is therefore very important.

The advanage of adding the correction voltage K into the adding circuit 48 in FIGURE 3 will now be considered. It can be used to compensate for certain errors that can occur either in the stabilized platform or in the gravity meter. In order to show this, a discussion will first be given of the errors. Equation 8 shows how errors in the measurement of gravity are affected by errors in verticality of the stabilized platform. For a desired gravity accuracy of 0.001 cm./sec.$^2$ the last term in (8) shows that the required vertical accuracy is only about five minutes, which is not difficult to obtain in a stabilized platform. However, the first term on the right side of (8) imposes a much more severe requirement on platform verticality. For the same desired accuracy in the presence of a sinusoidal horizontal acceleration of 0.05 g. amplitude, the amplitude of the sinusoidal platform error in phase with the horizontal acceleration cannot exceed eight seconds.

This eight second vertical accuracy requirement is not easy to satisfy. Errors of this order of magnitude in phase with the horizontal accelerations can be caused in various ways such as, for example, the following. If the stabilized platform is not perfectly balanced or the servos are not infinitely stiff, accelerations will cause verticality errors. Dead space or lags in the accelerometers or servos can also do so. It is even possible that horizontal accelerations might slightly change the direction of the sensitive axis of the gravity meter relative to its case. This would produce a verticality error even though the stabilized platform were perfect.

Because of such possibilities, it is desirable to be able to add a small compensating angular tilt in phase with the horizontal acceleration, to the gravity meter G. This can be done by making the correction voltage K proportional to the corresponding horizontal acceleration. In order to determine how much of this compensation to add, the best way is to make tests on a testing machine which subjects the gravity meter to various horizontal accelerations. This procedure permits very accurate adjustment to be made. It is even possible, if necessary, to make compensations which are different at different acceleration frequencies by adding condensers in the compensating circuits.

Other errors which can be approximately compensated for by a suitable choice of the correction voltage K are errors proportional to $\ddot{x}B$ or to $\ddot{x}\ddot{z}$, where B is the deflection of the gravity responsive element from its zero position, and $\ddot{z}$ is the vertical acceleration of the ship. These errors are known as cross-coupling errors and are discussed in detail in the applicants' previously mentioned article in Geophysics. In order to compensate for an error proportional to $\ddot{x}B$, the voltage K' is made proportional to B. This results in a stabilized platform vertical error which is also proportional to B. According to (8) the resulting error in gravity measurement is then proportional to $-\ddot{x}B-gB^2/2$. By a suitable adjustment of the amplitude of K the first term of the purposely introduced error can be made to balance out the original cross-coupling error proportional to $\ddot{x}B$. The second term $-gB^2/2$ of the purposely introduced error is very small compared to the first term and can usually be neglected. Similarly a cross-coupling error proportional to $\ddot{x}\ddot{z}$ can be corrected for by choosing the correction voltage K to be proportional to $\ddot{z}$.

There are of course other ways of correcting for cross-coupling effects. In the preferred form of the invention cross coupling of the form $\ddot{x}\ddot{z}$ is negligible and the other type is computed by a simple analog servomultiplier (not shown) and subtracted from the gravity reading. This method was used to avoid any possibility of error from the approximation mentioned in the preceding paragraph. In the preferred form of the invention, the correction voltage K is used, however, to compensate for any small platform verticality errors that might be present, as was described earlier. This use of the correction voltage K does not involve the previously mentioned approximation.

Although the adding circuit 48 and the gyro precessor 50 in FIGURE 3 are very simple circuits, they are shown in detail in FIGURES 5 and 6, respectively. In FIGURE 5 the voltages $E_1$ and $E_2$ are fed to the operational amplifier 54 (a high gain DC amplifier) through resistors as shown. The feedback resistor 55 is used to stabilize gain. The output is $c_1E_1+c_2E_2$ where the constants $c_1$ and $c_2$ are determined by the values of the resistors.

In FIGURE 6 the input signal H is fed to the operational amplifier 56 through a resistor and the feedback is through a resistor and condensor in series. An analysis of the circuit will show that the output H' is equal to $c_3H+c_4\int Hdt$ where $c_3$ and $c_4$ are constants.

From the foregoing it can be seen that the stabilized platform of the present invention which is suitable for mounting a gravity meter on a moving vehicle but also is suitable for mounting other devices such as a camera or a magnetometer, includes an improved erection system which compensates for acceleration and can also compensate for gravity meter imperfections and gravity meter errors due to horizontal acceleration or platform verticality. Additionally, the stabilized platform includes an improved shockmounting which isolates the platform from vibrations but prevents rotation of the outer support to provide for a rapid response of the erection system.

The foregoing disclosure and description of the invention are illustrative and explanatory thereof, and various changes in the size, shape, and materials, as well as in the details of the illustrated construction may be made, within the scope of the appended claims, without departing from the spirit of the invention.

What is claimed is:

1. A stabilized platform, comprising
    an outer support,
    an inner support,
    a platform structure,
    said structure being pivotally mounted to said inner support, said inner support being pivotally mounted to said outer support along an axis at an angle to the axis of the pivotal mounting of said structure, a frame, means resiliently supporting said outer support from said frame, linkage means connecting said outer support to said frame to maintain said outer support in substantially parallel relation to said frame, and means for moving said platform structure with respect to said supports.

2. A stabilized platform for use in measuring gravity in moving vehicles comprising, a support, an inner support pivotally mounted to said first mentioned support about a substantially horizontal axis, motor means for controlling the relative angular motion between said first mentioned support and said inner support, a gravity meter pivotally mounted to said inner support about a substantially horizontal axis at an angle to said first mentioned axis, a second motor means for controlling the relative angular motion between said gravity meter and said inner support, a power means to drive each of said motor means, gyro means mounted in fixed angular relation to said gravity meter to provide electric outputs indicative of rotations in space of said gravity meter about each of said axes, each of said outputs of said gyro means being applied as an input to one of said power means to control the corresponding motor to null the gyro output, said gyro means and motor means thereby operating to hold said gravity meter in an approximately stabilized orientation in space, horizontal accelerometer means mounted in fixed relation to said gravity meter to provide electric outputs indicative of tilts of the gravity meter about each of said axes and indicative of horizontal accelerations, said accelerometer means being adjusted relative to said gravity meter to null the outputs of said accelerometer means when the sensitive axis of said gravity meter is vertical and no horizontal accelerations are present, each of said outputs of said accelerometer means plus a constant times its time integral being applied to the corresponding gyro means to slowly precess it toward nulling the output of said accelerometer means to maintain the sensitive axis of the gravity meter approximately vertical, said accelerometer means and gyro means thereby controlling the motion of the sensitive axis of the gravity meter to oscillate with a period and damping dependent upon the signals applied to the gyro means by the accelerometer means, said integrals of the outputs of said accelerometer means applied to said gyro means being adjusted to make said oscillation periods several times longer than the longest period accelerations of substantial magnitude of said moving vehicle and appreciably less than 84 minutes, and said outputs of said accelerometer means applied to said gyro means being adjusted to make the damping of said oscillations approximately equal to $1/\sqrt{2}$ times critical.

3. A stabilized platform according to claim 2, wherein said oscillation period is adjusted to be approximately ten times the sea wave period.

4. A stabilized platform according to claim 2, wherein said oscillation period is adjusted to be at least ten times the sea wave period and substantially less than 84 minutes.

5. A stabilized platform according to claim 4, wherein said period is no longer than six minutes.

6. A stabilized platform according to claim 2, including alternate circuit means for applying said accelerometer outputs to said gyro means, and a switch for controlling which of said circuit means is connected between said accelerometer means and said gyro means.

7. A stabilized platform according to claim 6, wherein said oscillation period is four minutes in one position of said switch and six minutes with the other position of said switch.

8. A stabilized platform according to claim 2, wherein said motor means and said second motor means are direct drive servo motors.

9. A stabilized platform for use in measuring gravity in moving vehicles, comprising an outer support, an inner support, a platform structure, said structure being pivotally mounted to said inner support, said inner support being pivotally mounted to said outer support along an axis at an angle to the axis of the pivotal mounting of said structure, a frame, means resiliently supporting said outer support from said frame, power means for moving said platform structure with respect to said inner support, power means for moving said inner support with respect to said outer support, gyro means mounted in known relation to said platform structure and having outputs indicative of the rotation in space of said platform structure about the axes of said pivotal mountings, means connecting said gyro outputs to said power means to null said gyro outputs whereby said platform structure is maintained in substantially stabilized orientation in space, horizontal accelerometer means mounted in known relation to said platform structure and having outputs indicative of the tilting of said platform structure about said axes and indicative of horizontal acceleration of said platform structure, a gravity meter mounted on said platform structure and having a sensitive axis, said gravity meter being mounted to make said sensitive axis approximately vertical when said accelerometer outputs are nulled and no horizontal accelerations are present, generating means for supplying, from said accelerometer, output signals which are functions of the accelerometer outputs, portions of said signals being substantially proportional to the corresponding accelerometer outputs, other portions of said signals components being substantially proportional to the time integrals of the accelerometer outputs, and means connecting said signals to said gyro means to precess said gyro means and thereby tilt said platform structure toward nulling said accelerometer outputs, said tilting bringing said gravity meter sensitive axis toward vertical in a damped motion of incipient oscillatory character such as the motion of a damped pendulum, said components of said accelerometer signal functions being adjustable to make the periods of said damped incipient oscillatory motion several times longer than the periods of expected external horizontal accelerations, said components of said accelerometer signal functions also being adjusted approximately to minimize the average gravity meter error due to non-verticality of its sensitive axis.

10. A stabilized platform for use in measuring gravity in moving vehicles, comprising an outer support,
an inner support,
a platform structure,
said structure being pivotally mounted to said inner support,
said inner support being pivotally mounted to said outer support along an axis at an angle to the axis of the pivotal mounting of said structure,
power means for moving said platform structure with respect to said inner support,
power means for moving said inner support with respect to said outer support,
gyro means mounted in known relation to said platform structure and having outputs indicative of the rotation in space of said platform structure about the axes of said pivotal mountings,
means connecting said gyro outputs to said power means to null said gyro outputs whereby said platform structure is maintained in substantially stabilized orientation in space,
horizontal accelerometer means mounted in known relation to said platform structure and having outputs indicative of the tilting of said platform structure about said axes and indicative of horizontal acceleration of said platform structure,
a gravity meter mounted on said platform structure and having a sensitive axis,
said gravity meter being mounted to make said sensitive axis approximately vertical when said accelerometer outputs are nulled and no horizontal accelerations are present,
generating means for supplying, from said accelerometer outputs, signals which are functions of the accelerometer outputs,
means connecting said signals to said gyro means to precess said gyro means and thereby tilt said platform structure toward nulling said accelerometer outputs,
said accelerometer means and gyro means thereby controlling the motion of the sensitive axis of the gravity meter to oscillate with a period and damping dependent upon the signals applied to the gyro means by the accelerometer means,
said signals of said accelerometer means applied to said gyro means being adjusted to make said oscillation periods several times longer than the longest period accelerations of substantial magnitude of said moving vehicle,
said accelerometer signals applied to said gyro means being adjusted to make the damping of said oscillations approximately equal to $1\sqrt{2}$ times critical, and
means applying a portion of said outputs of said accelerometer means to said power means to tilt said gravity meter approximately in phase with accelerations to compensate for tilt errors.

11. A stabilized platform for use in measuring gravity in moving vehicles, comprising
an outer support,
an inner support,
a platform structure,
said structure being pivotally mounted to said inner support,
said inner support being pivotally mounted to said outer support along an axis at an angle to the axis of the pivotal mounting of said structure,
power means for moving said platform structure with respect to said inner support,
power means for moving said inner support with respect to said outer support,
gyro means mounted in known relation to said platform structure and having outputs indicative of the rotation in space of said platform structure about the axes of said pivotal mountings,
means connecting said gyro outputs to said power means to null said gyro outputs whereby said platform structure is maintained in substantially stabilized orientation in space,
horizontal accelerometer means mounted in known relation to said platform structure and having outputs indicative of the tilting of said platform structure about said axes and indicative of horizontal acceleration of said platform structure,
a gravity meter mounted on said platform structure and having a gravity responsive element,
generating means for supplying from said accelerometer outputs signals which are functions of the accelerometer outputs,
means connecting said signals to said gyro means to precess said gyro means and thereby tilt said platform structure toward nulling said accelerometer outputs,
means having an output responsive to the position of the gravity responsive element of said gravity meter, and
means applying a portion of said element position output to said moving means to tilt said gravity meter in an appropriate phase relation with the motion of said gravity responsive element to compensate for a cross coupling error.

12. A stabilized platform, comprising
an outer support,
an inner support,
a platform structure,
said structure being pivotally mounted to said inner support,
said inner support being pivotally mounted to said outer support along an axis at an angle to the axis of the pivotal mounting of said structure,
power means for moving said platform structure with respect to said inner support,
power means for moving said inner support with respect to said outer support,
gyro means mounted in known relation to said platform structure and having outputs indicative of the rotation in space of said platform structure about the axes of said pivotal mountings,
means connecting said gyro outputs to said power means to null said gyro outputs whereby said platform structure is maintained in substantially stabilized orientation in space,
horizontal accelerometer means mounted in known relation to said platform structure and having outputs indicative of the tilting of said platform structure about said axes and indicative of horizontal acceleration of said platform structure,
a force measuring instrument mounted on said platform structure and having a sensitive axis,
generating means for supplying from said accelerometer outputs signals which are functions of the accelerometer outputs,
said signals including components which are functions of the accelerometer outputs,
said signals also including components which are functions of the time integrals of the accelerometer outputs, and
means connecting said signals to said gyro means to precess said gyro means and thereby tilt said platform structure toward nulling said accelerometer outputs,
said tilting bringing said force measuring instrument sensitive axis toward vertical in a damped motion of incipient oscillatory character such as the motion of a damped pendulum,
said components of said accelerometer signal functions being adjusted to make the average error due to motion of the force measuring instrument counteract the average of the static error due to misalignment of the instrument with the vertical.

13. A stabilized platform according to claim 12, wherein said adjustment of said components of said accelerometer signal approximately minimizes the average force measuring instrument error due to non-verticality of its sensitive axis.

14. A stabilized platform according to claim 12, wherein said adjustment of said components is provided by adjusting said generating means to make the periods of said incipient oscillatory motion several times longer than the periods of expected external horizontal acceleration and to minimize the average force measuring instrument error due to non-verticality of its sensitive axis.

15. A stabilized platform for use in measuring gravity in moving vehicles including,
a frame adapted to be mounted on a moving vehicle,
a support,
means for shockmounting said support in said frame,
damping means connected between said support and said frame through spring means,
parallel motion means connected between said support and said frame to prevent relative angular motion between said support and said frame,
an inner support pivoted to said first mentioned support about a substantially horizontal axis,
motor means for controlling the relative angular motion between said first mentioned support and said inner support,
a gravity meter pivoted to said inner support about a substantially horizontal axis substantially normal to said first mentioned axis,
a second motor means for controlling the relative angular motion between said gravity meter and said inner support,
gyros mounted in fixed angular relation to said gravity meter to provide electric outputs indicative of rotations in space of said gravity meter about each of said axes,
each of said gyro outputs being applied as an input to one of said power means to control the corresponding motor means to null the gyro output,
said gyro and motor means thereby operating to hold said gravity meter in an approximately stabilized orientation in space,
horizontal accelerometers mounted in fixed relation to said gravity meter to provide electric outputs indicative of tilts of the gravity meter about each of said axes as well as indicative of horizontal accelerations,
said accelerometers being adjusted relative to said gravity meter to null the accelerometer outputs when the sensitive axis of said gravity meter is vertical and no horizontal accelerations are present, and
means for applying a function of said accelerometer outputs to said gyros to slowly precess them toward nulling the accelerometer outputs.

16. A stabilized platform according to claim 15, wherein
the center of gravity of said first mentioned support is approximately on said first mentioned axis, and
the combined center of gravity of said first mentioned support and said inner support is approximately on said last mentioned axis.

References Cited
UNITED STATES PATENTS

| | | | |
|---|---|---|---|
| 2,899,826 | 8/1959 | La Coste | 73—382 |
| 2,944,426 | 7/1960 | Amara | 74—5 XR |
| 2,955,474 | 10/1960 | Sutherland | 74—5 XR |
| 2,964,948 | 12/1960 | La Coste | 73—382 |
| 3,011,346 | 12/1961 | Garvin | 73—382 |
| 3,075,393 | 1/1963 | Lindgren | 74—5.5 XR |

JAMES J. GILL, Primary Examiner